(12) United States Patent
McKay

(10) Patent No.: US 7,192,996 B2
(45) Date of Patent: Mar. 20, 2007

(54) MANUFACTURING SOLVENT-FREE SOLID PAINT

(75) Inventor: Garry Michael McKay, Strathmore (AU)

(73) Assignee: BHP Steel (JLA) Pty. Ltd., Sydney (AU)

( * ) Notice: Subject to any disclaimer, the term of this patent is extended or adjusted under 35 U.S.C. 154(b) by 4 days.

(21) Appl. No.: 10/450,392

(22) PCT Filed: Dec. 12, 2001

(86) PCT No.: PCT/AU01/01601

§ 371 (c)(1),
(2), (4) Date: Sep. 25, 2003

(87) PCT Pub. No.: WO02/48271

PCT Pub. Date: Jun. 20, 2002

(65) Prior Publication Data

US 2004/0048953 A1    Mar. 11, 2004

(30) Foreign Application Priority Data

Dec. 15, 2000   (AU)   ..................................... PR2106

(51) Int. Cl.
*C08K 3/00*   (2006.01)
*B01F 3/00*   (2006.01)
(52) U.S. Cl. ........................ 523/351; 366/145; 366/348
(58) Field of Classification Search ................ 366/147, 366/144, 605, 348; 360/145, 146, 147, 148, 360/149, 76.1, 76.2, 76.3; 523/351
See application file for complete search history.

(56) References Cited

U.S. PATENT DOCUMENTS

| | | | | |
|---|---|---|---|---|
| 2,590,442 A | * | 3/1952 | Miller et al. ................. | 392/496 |
| 2,763,575 A | * | 9/1956 | Bede .......................... | 427/422 |
| 2,980,339 A | * | 4/1961 | Bok et al. .................... | 239/135 |
| 3,449,291 A | | 6/1969 | Bartsch et al. | |
| 3,657,001 A | * | 4/1972 | Parker ..................... | 427/388.3 |
| 3,820,718 A | * | 6/1974 | Ammpn ....................... | 239/135 |
| 3,880,360 A | * | 4/1975 | Peng et al. ...................... | 241/3 |
| 3,940,453 A | * | 2/1976 | Labana et al. ................. | 525/53 |
| 4,071,167 A | * | 1/1978 | Kelly ......................... | 366/144 |
| 4,259,021 A | * | 3/1981 | Goudy, Jr. ................... | 366/144 |
| 4,301,119 A | * | 11/1981 | Cobbs et al. ................ | 422/133 |
| 4,342,844 A | | 8/1982 | Torenbeek et al. | |
| 4,379,836 A | | 4/1983 | Koepke et al. | |
| 4,390,126 A | * | 6/1983 | Buchholz et al. ............... | 239/1 |
| 4,527,712 A | * | 7/1985 | Cobbs et al. ................... | 222/1 |
| 4,988,767 A | | 1/1991 | Pettit, Jr. | |
| 4,990,364 A | * | 2/1991 | Bolte et al. .................. | 427/503 |
| 5,411,715 A | | 5/1995 | Czekai et al. | |
| 5,658,383 A | * | 8/1997 | Cutshall ...................... | 118/64 |
| 5,921,679 A | | 7/1999 | Muzzio et al. | |
| 6,012,447 A | | 1/2000 | Clark et al. | |
| 6,130,273 A | | 10/2000 | Edwards et al. | |
| 6,752,323 B1 | * | 6/2004 | Roos et al. .................... | 239/63 |

FOREIGN PATENT DOCUMENTS

| | | |
|---|---|---|
| AU | 46294/64 B | 1/1966 |
| AU | 44610/72 B | 1/1974 |
| GB | 1 236 430 A | 6/1971 |
| GB | 1 447 594 A | 8/1976 |
| NL | 9 101 272 A | 2/1993 |

OTHER PUBLICATIONS

Japan Patent Abstract, vol. 1998, No. 9, dated Jul. 31, 1998, JP 10 109027 A (Kansai Paint Co. Ltd.), Apr. 28, 1998 (abstract, figures 1-3).

* cited by examiner

*Primary Examiner*—Tony G. Soohoo
(74) *Attorney, Agent, or Firm*—Miles & Stockbridge P.C.; Edward J. Kondracki

(57) ABSTRACT

A method and apparatus for manufacturing small batches of solid paint is disclosed, which method includes a first step of providing a component of the solid paint as a liquid in a heated mixing container that has a base and sides and includes a stirrer for stirring the contents of the container. The next step of the method includes controlling, heating and stirring of the contents of the container and progressively adding other components of the solid paint as solids to the container. The liquid acts as a heat transfer medium that transfers heat from the heated container and from the stirrer to the solids. The mix is heated to a temperature of the solid paint and forms a melt that is a uniform liquid. The final step in the method includes discharging the melt from the container and allowing the melt to cool and form the solid paint.

13 Claims, 2 Drawing Sheets

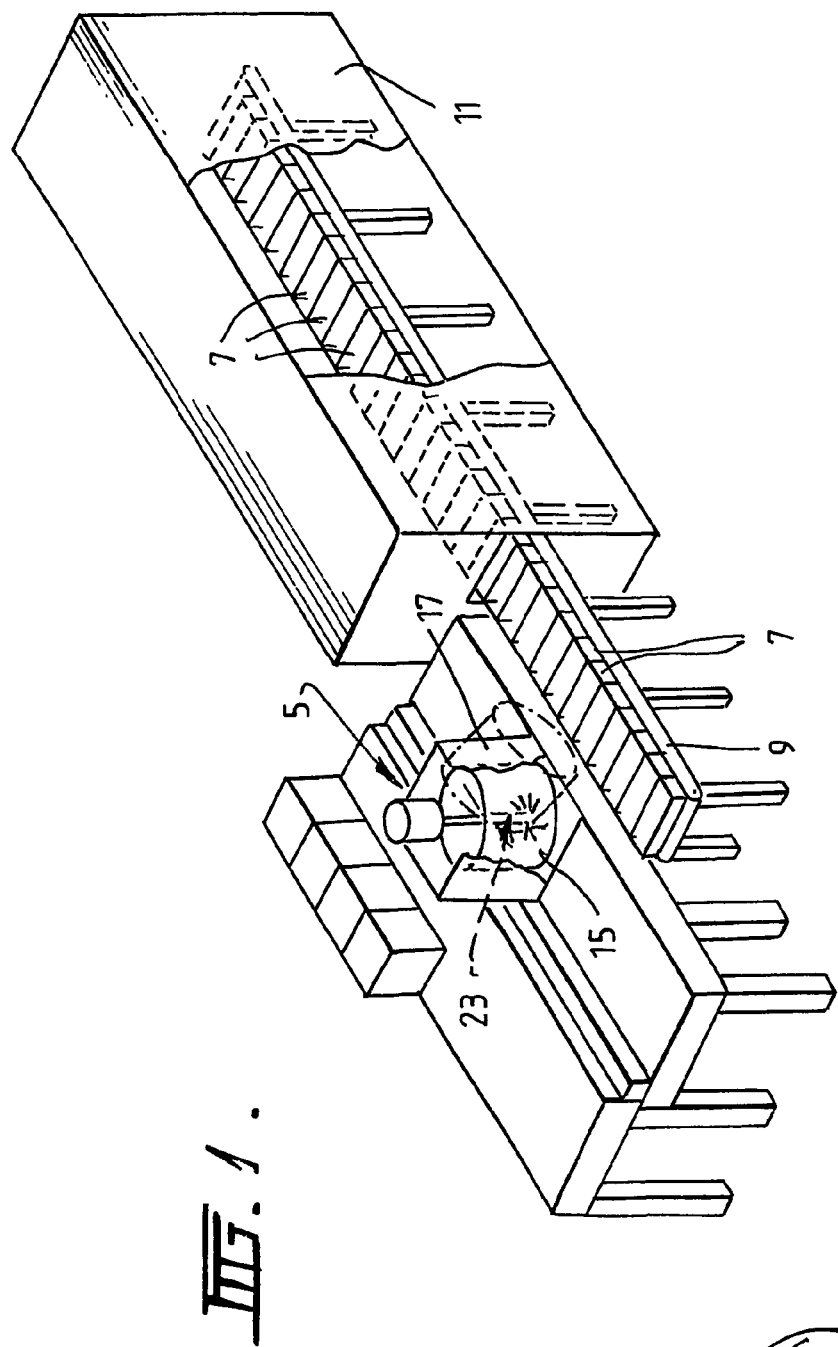
Fig. 1.
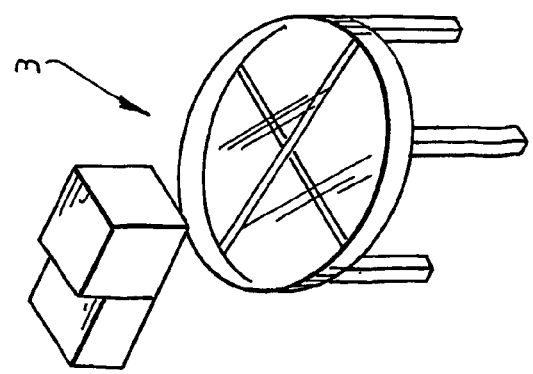

MANUFACTURING SOLVENT-FREE SOLID PAINT

BACKGROUND OF THE INVENTION

1. Field of the Invention

The present invention relates to a method and an apparatus for manufacturing a solvent-free coating that is solid at ambient temperature (hereinafter referred to as "solid paint").

2. Description of Related Art

Typically, the term "solid paint" includes coatings that are polymer-based and, by way of example, have a resin, a pigment and a cross-linking agent as the main constituents of the coatings.

It will be understood that the term "solid paint" includes coatings that do not have sharply defined melting points (and the precise state of the coatings depends on the exact ambient temperature) but which are solid at most ambient temperatures.

It will also be understood that the term "solvent-free" includes coatings that contain small amounts of residual solvents (for example residue from the manufacturing process).

Examples of solid paints are powder coatings and paints exemplified in Australian patent 651007.

It is difficult to manufacture small quantities of solid paint efficiently and quickly. The reason for this is that solid paint cannot readily be manufactured by the conventional route that is often used for small quantities of solvent-based and water-based paints. These liquid coatings often make use of bases or tinters to allow small quantities to be made quickly, efficiently, with low loss, and at low cost. Until now, this manufacturing technique has not been available for solid paint. As a consequence, conventionally, solid paint is manufactured in small batches on apparatus that is designed for large batches, with the result that there are long equipment clean-up times at colour changeovers and proportionally large losses of paint at such changeovers.

One attempt to overcome the difficulty of manufacturing small quantities of solid paint efficiently and quickly involves grinding powdered paint to a very small particle size and combining the powdered paint with coloured powders and agglomerating the mixed powders to produce a paint with the required visual colour. This is described in Australian patent 643191.

This proposal suffers from the disadvantage of considerable expense of grinding powdered paint to very small particle sizes and thereafter agglomerating mixtures of ground powdered paint and coloured powders to required product size.

In addition, processing solid paints that are thermosetting paints in accordance with this proposal is especially difficult since thermosetting paints are liable to change chemically if the processing temperature exceeds the cross-linking temperature of the paints. This is a significant issue since solid paints are usually thermosetting paints.

Another attempt to make small quantities of solid paint is disclosed in U.S. Pat. No. 6,130,273. The method disclosed in the US patent includes the steps of extruding a high glass transition temperature (Tg) resin, pigments and any other solid compounds (such as cross-linkers and flow modifiers), melt blending the extrudate and a low Tg resin (liquid at ambient temperature) to form a mixture, and allowing the mixture to cool.

While this method may produce a coating with useful properties, it is not a manufacturing method which can easily and efficiently manufacture small batches, but rather is appropriate for large batches. Us of an extruder to incorporate the liquid resin into the molten coating as a last stage presents the difficulties of cleaning and wastage and lengthy delays when required to manufacture small batches of different colours often. In addition the method requires other equipment such as a powder mixer. It is difficult in a manufacturing environment to schedule all the equipment to be available to respond to manufacturing requirements quickly.

Another attempt to make small quantities of solid paint involves using a mixer know as a Z-Mixer. This mixer consists of a mixing vessel fitted with one or more stirrer blades, each of which are in a Z shape and rotate about a horizontal axis. This type of mixer finds common use for dispersing solid particles in a liquid to form a high viscosity paste. (eg. for kneading dough in a biscuit manufacture). However it is not appropriate for producing solid paint which requires bulk melting of the solid rather than dispersing small solid particles. It suffers from slowness in infusing heat into the mix (because the stirrer blades cannot move quickly) and consequently long processing time. It is also extremely difficult to clean. Both these key problems make it inappropriate for efficient manufacture of small batches of sold paint.

Another attempt to make small quantities of solid paint involves using a Banbury mixer. Banbury mixers are commonly used in the rubber industry to incorporate material into viscous media. The mixers have two interrupted spiral rotors moving in opposite directions to produce a high shearing zone. The mixers are not appropriate for manufacturing small quantities of solid paint as cleaning times are lengthy and product losses are high.

An object of the present invention is to provide a method of manufacturing solid paints that has advantages over and is not subject to the disadvantages of the above-described methods.

SUMMARY OF THE INVENTION

According to the present invention there is provided a method of manufacturing a solid paint which includes the steps of:
(a) providing a component of the solid paint as a liquid in a heated mixing container that has a base and sides and includes a stirrer for stirring the contents of the container;
(b) controlling heating and stirring of the contents of the container and progressively adding other components of the solid paint as solids to the container, the liquid acting as a heat transfer medium that transfers heat from the heated container and from the stirrer to the solids and heats the mix to a temperature above the glass transition temperature of the solid paint and forms a melt that is a uniform liquid; and
(c) discharging the melt from the container and allowing the melt to cool and form the solid paint.

The above-described method of the present invention is different from applications in which solid materials are dissolved in liquids (commonly solvents)(hereinafter referred to as "simple dissolving of solids in liquids").

The method of the present invention is concerned with melt mixing and, mor particularly, with ensuring maximum controlled heat input to the system to melt the solid phase component of the solid paint.

Simple dissolving of solids in liquids does not have the same critical reliance on maximising controlled heat input.

Typically, polymers, such as resins, are the major constituents of solid paint and simple dissolving of polymers in liquids is not a practical option for forming a homogeneous liquid from all the constituents of a polymer-based solid paint. Specifically, because of the high polymer content of solid paint, simple dissolving of solids in liquids would involve dissolving a relatively large polymer component in a relatively small liquid component. Even if this was possible given solubility issues, the resultant "liquid" would have a very high viscosity and would be difficult to process further.

The method and the apparatus of the present invention make it possible to achieve controlled heat build-up in the solid/liquid mixture to a temperature above the glass transition temperature of the solid paint. Controlled heat build-up is a very important requirement for polymer-based solid paints and is not a requirement for simple dissolving of solids in liquids.

In simple dissolving of solids in liquids it is often advantageous to add all of the solids at one time. However, this is not the case with the method of the present invention.

Furthermore, in simple dissolving of solids in liquids partial dissolution of the surface of a particle aids its flow in the solid/liquid mixture. The opposite is the case with melt mixing as in the method of the present invention where the inevitable high viscosity of the melt at cool surfaces, i.e. at solid/liquid and solid/solid interfaces, causes agglomeration, hinders stirring, and reduces the rate of heat flow into solid particles.

The way that heat infuses into the paint components in a controlled manner in the method of the present invention is critical to the invention. By way of illustration of this point, it has been found that simply loading the whole solid paint composition into a heated container, allowing it to melt, then mixing it, is not a commercially useful method. The two key constraints on polymer-based solid paints are that the temperature of the wall of the pot must be maintained below the crosslinking temperature of the paint, and secondly, useful polymer-based coatings commonly have high specific heats. In situations where the whole solid paint composition is loaded into a heated container, these two constraints result in an excessively long processing time, as for much of the heating cycle, the mix cannot be stirred. The stirring can only commence after it has substantially melted as the high paint viscosity at the solid/liquid interface prevents smooth flow and places too great a load on the mixer motor. This causes poor productivity and high expense in a commercial environment. Hence the staged addition method of the present invention is critical to cause heat to infuse into the mix in a short period of time.

The above-described method of the present invention is suited particularly to manufacturing small batches of solid paint, typically less than 60 kg.

Preferably the component of the solid paint that is provided as the liquid in step (a) is a liquid at ambient temperature.

In an alternative, although not the only other embodiment, the component of the solid paint that is provided as the liquid in step (a) is a solid at ambient temperature and is formed into a liquid by heating prior to being added in step (a).

In an alternative, although not the only other embodiment, the component of the solid paint that is provided as the liquid in step (a) is a solid at ambient temperature and is added to the container as a solid and is melted to a liquid in the container.

Preferably the solid paint is polymer-based.

Preferably the ingredients of the solid paint include a solid resin at ambient temperature, a liquid resin at ambient temperature, a pigment, and a cross-linking agent.

Preferably the liquid component of the solid paint in step (a) is the liquid resin at ambient temperature.

Preferably the solid components of the solid paint added in step (b) include the solid resin at ambient temperature.

Preferably the solid resin is in the form of chips.

The solid resin may be in any other form, such as powders or pellets.

Preferably the method includes varying the rate of rotation of the stirrer as a means of controlling the heating of the container contents.

Preferably the method includes adjusting the height of the stirrer in the container as a means of controlling the method.

If too much heat is provided, the melt in contact with the walls of the container will cross-link and be damaged before the solid phase is sufficiently liquid to be stirred in with the melt. Therefore, the wall temperature should be well controlled and should not exceed the cross-linking temperature of the melt. This restricts the rate of energy transfer to the mix from the mixing container.

Accordingly, preferably the method includes controlling the wall temperature of the container so that it does not exceed the cross-linking temperature of the melt.

It is difficult to remove heat from the melt. This is an issue in situations where the properties of the solid paint require that it be filled at a temperature that is below the temperature at which the paint mixes well. Cooling via the walls of the mixing container may cause solidification of the melt on the walls, insulating the walls from delivering a further cooling effect. Furthermore, the stirrer may deliver more heat into the melt than is being removed by cooling.

Accordingly, preferably the method includes heating the liquid/solid mixture to a high temperature in the early part of heating/solids addition/mixing step (b)(such that the temperature is well above the glass transition temperature of the solid paint—typically 50–80° C. above Tg for amorphous polymer systems) and delaying adding the last of the solid component of the solid paint in step (b) until at or near the end and then adding the solid component with slow stirring.

Preferably, the step of adding the last of the solid component of the solid paint includes reducing the rate of rotation of the stirrer (to reduce the rate at which the stirrer delivers heat to the melt), raising the stirrer (to ensure that mixing still occurs on the surface of the melt), reducing the wall temperature of the container, and adding the last 5–40%, more preferably 15–30%, of the solid component of the solid paint to reduce the temperature of the melt, e.g. from 130° C. to below 100° C.

The above-described method is not confined to adding a liquid component of the solid paint in step (a) only. Specifically, the liquid component(s) of the solid paint may also be added after step (a).

According to the present invention there is also provided an apparatus for manufacturing a solid paint, which apparatus includes:

(a) a mixing assembly for producing a well mixed melt at a temperature above the glass transition temperature of the solid paint from components of the solid paint that are supplied as solids and liquids, which melt forms the solid paint on cooling below the glass transition temperature, which mixing assembly includes a heated mixing container that has a base and sides and further includes a stirrer that is adapted to extend into the container;

(b) a means for supplying measured amounts of the components of the solid paint as solids and liquids to the container;

(c) a means for receiving melt discharged from the container to allow the melt to solidify into the solid paint.

The melt receiving means may include any suitable means, such as a series of trays or a cooling conveyor belt.

BRIEF DESCRIPTION OF THE DRAWINGS

The present invention is described further by way of example with reference to the accompanying drawings, of which:

FIG. 1 is a 3-dimensional plant layout of a preferred embodiment of an apparatus for manufacturing solid paint in accordance with the present invention;

DETAILED DESCRIPTION OF THE PREFERRED EMBODIMENTS

Figure 2:
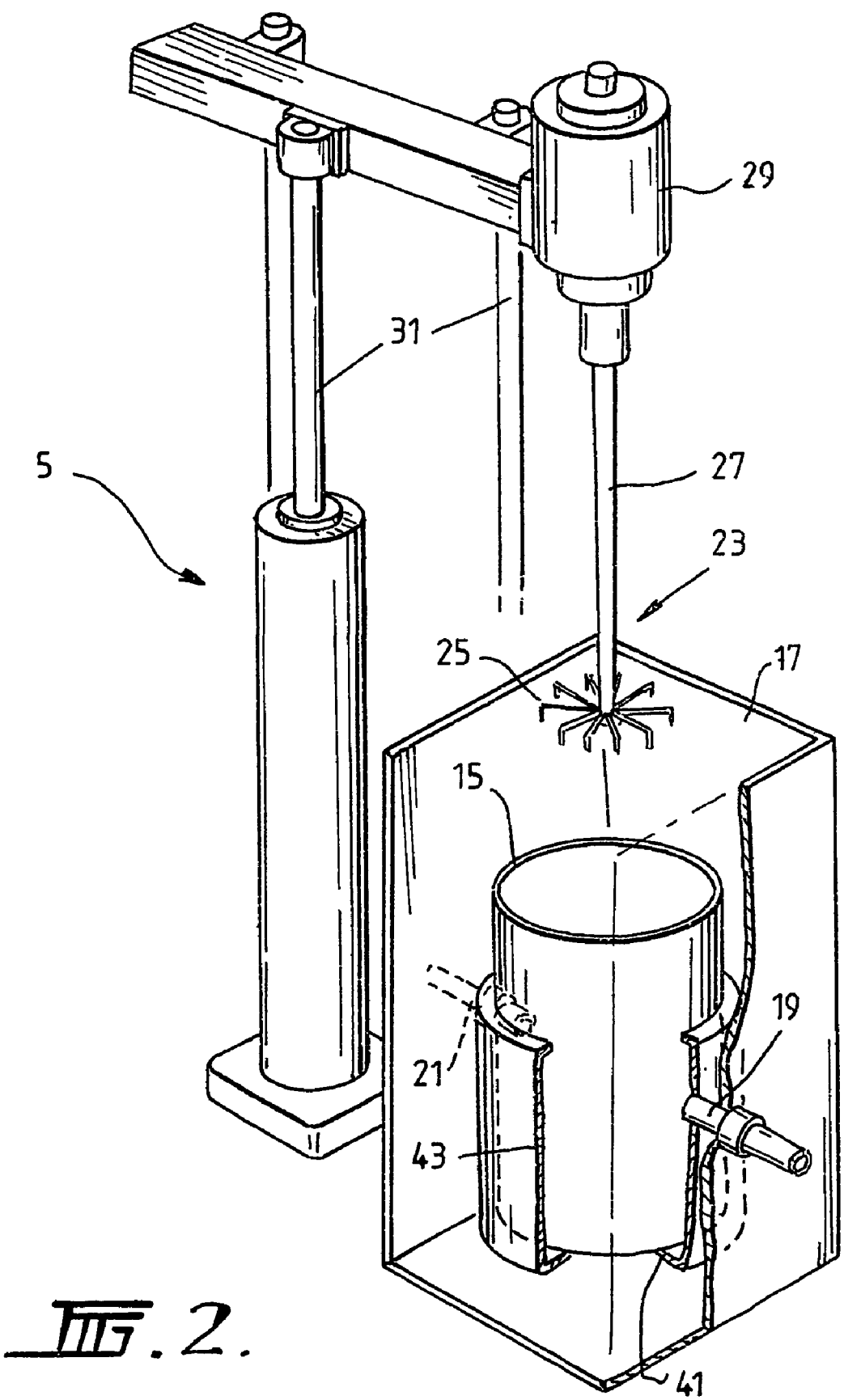
FIG. 2 is a schematic perspective view of a basic form of a mixing container that forms part of the plant layout shown in FIG. 1.

With reference to FIG. 1, in order to manufacture a batch of a polymer-based solid paint of a given composition, predetermined amounts of solid and liquid components of the solid paint are weighed at a weighing station 3 and thereafter are introduced to a mixing assembly that is generally identified by the numeral 5.

The solid and liquid components of the solid paint include resin (in solid and liquid forms), pigment, and cross-linker.

As is described in more detail hereinafter, in accordance with the present invention, the solid and liquid components of the solid paint are selectively added to a heated mixing container 15 that forms part of the mixing assembly 5 in a predetermined sequence, with the result that a batch of a melt in the form of a well mixed liquid at a temperature above the glass transition temperature of the solid paint forms in the mixing container 15.

At the end of the above-described batch operation, the melt in the mixing container 15 is discharged into an array of moulds 7 positioned side by side on a conveyer 9 that is arranged to move the moulds 7 stepwise past the mixing container 5. The liquid poured into the moulds 7 is transported via the conveyer 9 into a cooling room 11, and blocks of solid paint form in the moulds 7.

With reference to FIG. 2, the basic form of the heated mixing container 15 of the mixing assembly 5 includes a base 41 and sides 43 and is located in a cabinet 17. The mixing container 15 is supported by the cabinet 17 as shown in FIG. 2 so that it can be tilted from the upright position shown in FIGS. 1 and 2 to an angled position shown in FIG. 1. In the angled position, the contents of the mixing container 15 can flow downwardly and outwardly from the mixing container 15 into the moulds 7. Specifically, the mixing container 15 includes diametrically opposed hollow shafts 19, 21 that are supported by the sides of the cabinet 17 for tilting movement.

The sides 43 of the mixing container 15 have a double-wall construction that defines a hollow shell and has an inlet and an outlet for supplying heated water to and removing the water from the shell. The inlet is in the form of the hollow shaft 19 and the outlet is in the form of the hollow shaft 21. In use, the heated water is supplied under pressure. The water temperature and flow rate may be varied as required depending on shell temperature requirements.

The mixing assembly 5 also includes a stirrer, generally identified by the numeral 23, that is adapted to extend into the mixing container 5. The stirrer 23 includes a stirrer blade 25 mounted on the end of a drive shaft 27 that extends from a drive motor 29.

The drive motor 29 is a variable speed drive motor so that the rate of rotation of the stirrer block 25, and therefore the heat generated by the stirrer blade 25 can be varied as required.

The stirrer blade 25 is selected to have a diameter that is much larger than would typically be optimum for mixing liquid paints, or simply dissolving polymers in solvents. This enhances heat generation within the mix.

The mixing assembly 5 also includes an upright support shaft 31 that supports the drive motor 29 for sliding movement along the shaft 31. Consequently, the stirrer blade 25 can be selectively moved into and out of the mixing container 15 and selectively located at different levels within the mixing container 15.

The first step in manufacturing a batch of a solid paint using the mixing assembly 5 is to add a predetermined amount of a liquid component of the solid paint to the mixing container 15 with the mixing container 15 heated by pressurised hot water flow through the shell to a required temperature and with the stirring blade 25 extending into the liquid phase and operating at an idle speed of the order of 100 rpm.

The next step in the method is a heating/mixing step that involves adding a solid component of the solid paint under controlled heat input and stirring conditions to melt the solid.

Initially the solid component of the solid paint is added at a relatively slow rate (compared to an average rate of addition over the whole method) to allow time for heat infusion from the heated shell of the mixing container 15 while increasing the rate of rotation of the stirr r blade 25 to increase heat input via the stirrer blade 25.

As the rate of rotation of the stirrer blade 15 increases (typically, to a fully operational speed of 1000–3000 rpm), and there is increasing heat generated by the stirrer blade 25, the rate of adding the solid component of the solid paint may be increased.

Preferably towards the end of the above-described hearing/mixing step, the rate of rotation of the stirrer blade 25 is reduced to prevent excessive heat build-up.

In addition, preferably towards the end of the above-described heating/mixing step the stirrer blade 25 is positioned near the surface of the melt to ensure proper mixing at the slower mixing speed used at this stage.

The heating/mixing step continues until such time as the solid melts and a well-mixed liquid forms and the liquid is at a temperature that is above the glass transition temperature of the solid paint.

At this point, the batch of well-mixed liquid is discharged from the mixing container 15 by tilting the container and pouring the contents into the moulds 7.

The present invention has a number of advantages over known methods and apparatus.

By way of example, the use of a tiltable container greatly simplifies cleaning of the apparatus. Specifically, the apparatus does not have valves that are difficult and time-consuming to clean and which are prone to cooling and blocking.

Furthermore, the present invention can accommodate colour changes and different gloss level paints without difficulty.

In addition, all generic resin types can be used in the present invention because the method relies on melting the resin, not relying on it being soluble in any particular media.

In addition, the present invention provides a convenient means of changing the colour or properties of a previously manufactured solid paint. This is often required when the paint is inadvertently made to the wrong colour. In this case, the paint can be melted and extra ingredients added to change the colour or correct the deficiency.

In addition, the present invention allows a wide latitude in the formulation of the solid paint. It can accommodate very low and very high levels of the liquid component by giving simultaneous control over the heat from the vessel walls, the stirrer speed, the stirrer height, and the rate of addition of material.

The present invention is described further by reference to the following examples.

EXAMPLE 1

A double walled pot of the type described in relation to FIG. 2 was heated by pressurised water to 130° C. It was fitted with a 2.2 kW stirrer. A thermosetting paint based on polyester resin, pigments and urethane crosslinker was made in the pot by adding progressively solid components to an initial batch of liquid components of the paint and forming a well-mixed liquid over a time period of 20 minutes, by adding in order:

| (i) | 100% solids low Tg polyester resin with a Tg of −46° C. (i.e. it was liquid at room temperature) | 1100 g; |
|---|---|---|
| (ii) | solid urethane crosslinker (added over a period of 1–5 minutes) | 700 g; |
| (iii) | a dispersion of pigment in a high Tg resin (Tg 34° C.) (added over a period of 1–5 minutes) | 2000 g; |
| (iv) | a dispersion of a different coloured pigment in the same high Tg resin (Tg 34° C.) (added over a period of 1–5 minutes) and | 2000 g; |
| (v) | a dispersion of extender in a high Tg resin (Tg 34° C.). | 3000 g. |

During these additions the stirrer speed was controlled and increased from 100 rpm to 2500 rpm. On completing the additions, the stirrer speed was reduced to 600 rpm, the stirrer was raised to be near the surface of the mixture, the temperature of the water used to heat th double walled pot was reduced to 90° C., and then 1200 g of a polyester resin of Tg 34° C. (i.e. solid at room temperature) was added to complete the paint. This system produced a homogeneous paint, which was solid when poured into a mould and allowed to cool to room temperature. When applied to a metal substrate, it produced an even, uniform film.

EXAMPLE 2

A thermoplastic paint similar in content to Example 1, was made, omitting the extender from the composition. The resulting paint was applied at low film builds to continuous strip and formed a continuous even coating. It was uniform in appearance showing no sign that it had been made from differently coloured bases.

EXAMPLE 3

A double walled pot of the type described in relation to FIG. 2 was heated by pressurised water to 140° C. It was fitted with a 11 kW stirrer. A thermosetting paint based on polyester resin, pigments and melamine formaldehyde resin crosslinker was made in the pot over approximately 2 hours, by adding the following components of the paint, in order:

| (i) | 100% solids low Tg polyester resin with Tg of −46° C. (i.e. it was liquid at room temperature) | 4200 g; |
|---|---|---|
| (ii) | a dispersion of pigments in a high Tg resin (Tg 34° C.) | 42000 g; |
| (iii) | 100% solids low Tg melamine formaldehyde resin with a Tg of approximately −40° C. (i.e. it was liquid at room temperature) | 3700 g; |
| (iv) | catalyst additives. | 65 g; |

During these additions the stirrer speed was controlled and increased from 100 rpm to 1000 rpm. Component (ii) was added slowly to maintain a temperature of 90–115° C. On completing the addition of component (ii) the stirrer speed was reduced to about 300 rpm, the stirrer was raised to be near the surface of the liquid/solid mixture, the temperature of the water used to heat the double walled pot was reduced to 90° C., and components (iii) and (iv) were added. This system produced a homogeneous paint, which was solid when allowed to cool to room temperature. When applied to a metal substrate, it produced an even, uniform film.

Many modifications may be made to the preferred embodiment described above without departing from the spirit and scope of the present invention.

By way of example, the mixing container 15 may be coated with appropriate coatings, such as Teflon (Registered trade mark), in order to facilitate cleaning and reduce product losses.

By way of further example, while the preferred embodiment includes a mixing container 15 that has a double wall that defines a shell and is heated by pressurised hot water flowing through the shell, the present invention extends to any container construction and means of heating the container. Other options include indirect heating such as pot in pot heating and other direct heating options such as electric, hot air and oil.

By way of further example, while the preferred embodiment includes a series of moulds 7, the present invention extends to any other suitable means, such as a continuous belt, for receiving the melt from the mixing container 15.

By way of further example, while the Examples demonstrate mixing of pigments dispersed in resins the pigments themselves may be added directly to the mixing container 15 and dispersed as a result of shear generated within the container.

By way of further example, while the preferred embodiment and the Exampl s including adding solid components of a point while the stirrer is operating, the present invention is not so limited and extends to situations in which solid components are added while the stirrer is not operating (for example, in order to facilitate solids addition) and operation of the stirrer commences at a later time.

What is claimed is:

1. A method of manufacturing a polymer-based solid paint which includes the steps of:
   (a) providing a component of the solid paint as a liquid in a heated mixing container that has a base and sides and includes a stirrer for stirring the contents of the container;

(b) after step (a) controlling heating and stirring of the contents of the container and progressively adding other components of the solid paint as solids to the container, the liquid acting as a heat transfer medium that transfers heat from the heated container and from the stirrer to the solids and heats the mix to a temperature above the glass transition temperature of the solid paint and forms a melt that is a uniform liquid; and (c) discharging the melt from the container and allowing the melt to cool and form the solid paint.

2. The method defined in claim 1 wherein the component of the solid paint that is provided as the liquid in step (a) is a liquid at ambient temperature.

3. The method defined in claim 1 wherein the component of the solid paint that is provided as the liquid in step (a) is a solid at ambient temperature and is formed into a liquid by heating prior to being added in step (a).

4. The method defined in claim 1 wherein the component of the solid paint that is provided as the liquid in step (a) is a solid at ambient temperature and is added to the container as a solid and is melted to a liquid in the container.

5. The method defined in claim 1 wherein the ingredients of the solid paint include a solid resin at ambient temperature, a liquid resin at ambient temperature, a pigment, and a cross-linking agent.

6. The method defined in claim 5 wherein the liquid component of the solid paint provided in step (a) includes the liquid resin at ambient temperature.

7. The method defined in claim 5 wherein the solid component of the solid paint added in step (b) includes the solid resin at ambient temperature.

8. The method defined in claim 6 wherein the solid component of the solid paint added in step (b) includes the solid resin at ambient temperature.

9. The method defined in claim 1 including controlling heating and stirring of the container contents by varying the rate of rotation of the stirrer.

10. The method defined in claim 1 including controlling heating and stirring of the container contents by adjusting the height of the stirrer in the container.

11. The method defined in claim 1 including controlling heating of the container contents by controlling the wall temperature of the container so that it does not exceed the cross-linking temperature of the melt.

12. The method defined in claim 1 including heating the mix in an early part of the step (b) to a temperature 50–80° C. above the glass transition temperature of the mix, and then adding the solid components of the solid paint in step (b) with slow stirring.

13. The method defined in claim 12 wherein the step of adding the last of the solid component of the solid paint includes reducing the rate of rotation of the stirrer to reduce the rate at which the stirrer delivers heat to the melt, raising the stirrer to ensure that mixing still occurs on the surface of the melt, reducing the wall temperature of the container, and adding the last 5–40% of the solid component of the solid paint to reduce the temperature of the melt.

* * * * *